Feb. 17, 1953         W. D. BROCKMAN        2,628,636

ROTARY CONTROL OIL OR GREASE DISTRIBUTOR

Filed Oct. 1, 1948                                    2 SHEETS—SHEET 1

Inventor
William D. Brockman

By Patrick D. Beavers

Attorney

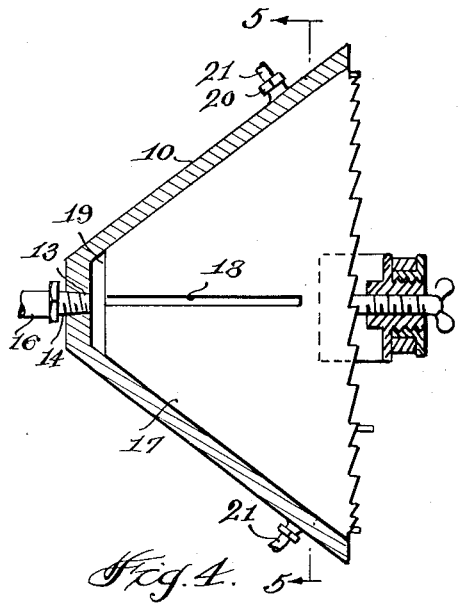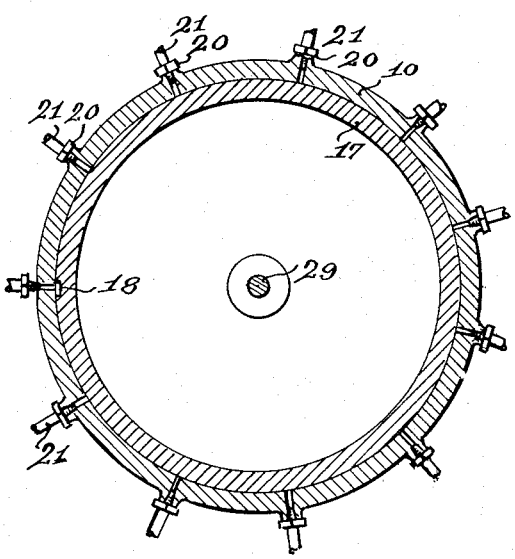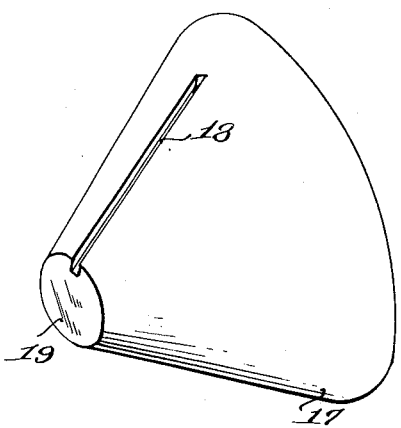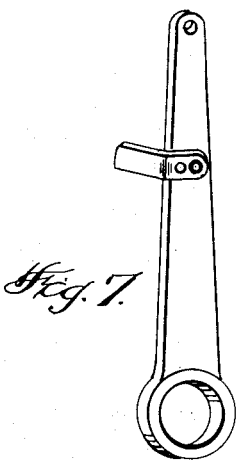

Patented Feb. 17, 1953

2,628,636

UNITED STATES PATENT OFFICE 2,628,636

ROTARY CONTROL OIL OR GREASE DISTRIBUTOR

William D. Brockman, Pomeroy, Wash.

Application October 1, 1948, Serial No. 52,313

1 Claim. (Cl. 137—627)

The present invention relates to control oil or grease distributors and it consists in the combinations, constructions and arrangements of parts herein described and claimed.

It is an object of the present invention to provide a control oil or grease distributor by which a machine such as, for example, a combine harvester may be lubricated from a central location.

Another object of the invention is the provision of an apparatus of the character set forth which is adapted to successively distribute lubricant under pressure to a plurality of oil or grease lines.

Another object of the invention is the provision of novel means and mechanism whereby lubricant under pressure may be distributed from a single source to selected lubricant receiving lines.

Another object of the invention is to provide an apparatus of the character set forth which is simple in construction and operation and which is effective and efficient in use.

Other and further objects of the invention will become apparent from a reading of the following specification taken in conjunction with the drawings, in which:

Figure 4 is a view similar to Figure 2 but showing certain parts in elevation,

Figure 5 is a sectional view taken along line 5—5 of Figure 4, and

Figures 6 and 7 are perspective views of certain elements of the invention.

Figure 1:
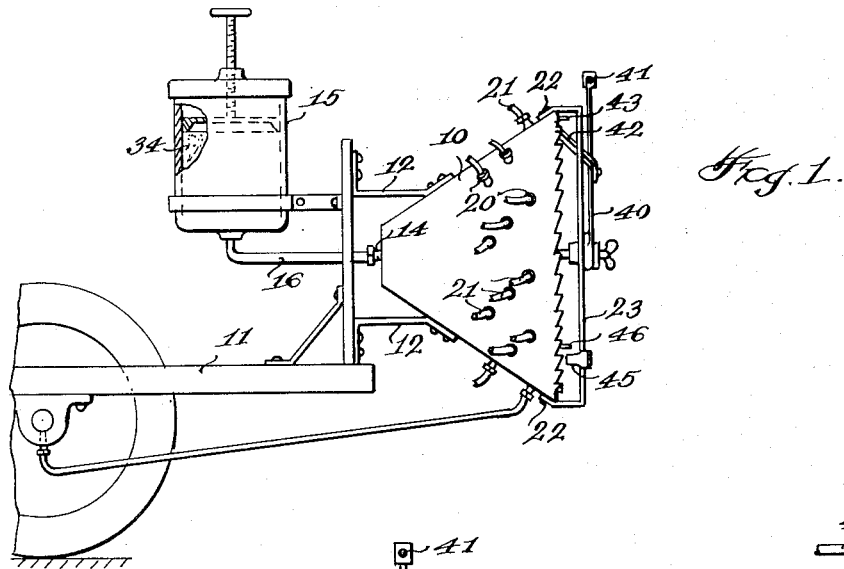
Figure 1 is a side elevational view of an embodiment of the invention.
Figures 2, 3:
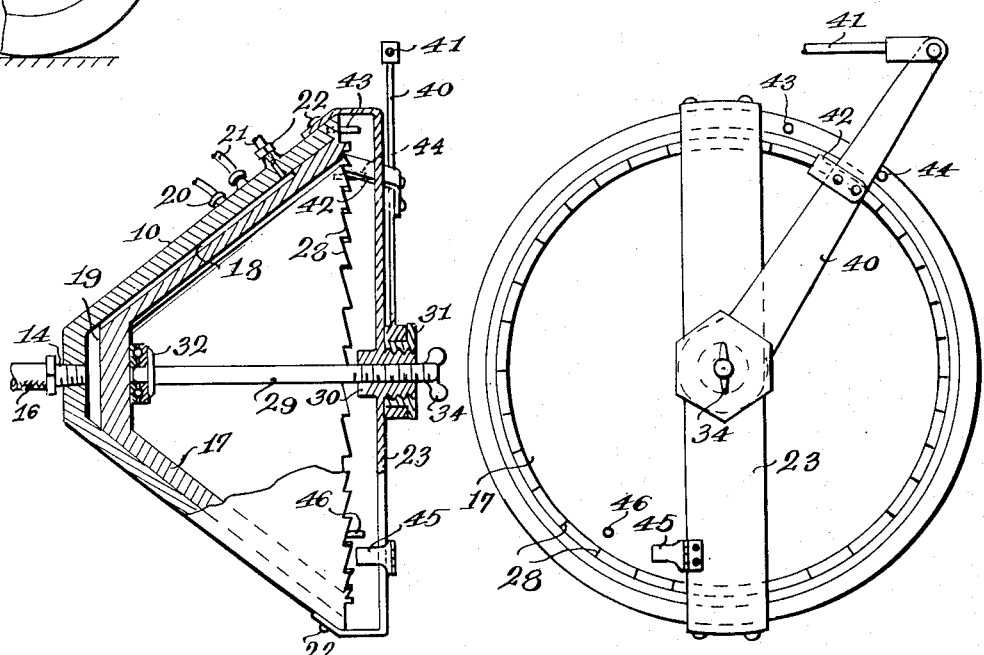
Figure 2 is an enlarged vertical sectional view thereof.
Figure 3 is an end view of Figure 2.

Generally, the invention comprises a distributor for lubricant consisting of a substantially cone-shaped outer member into the smaller end of which is tapped a line which is, in turn, connected with a grease gun or like source of lubricant under pressure. A conical inner member is provided with a groove extending longitudinally in its outer side from the smaller end thereof to a point adjacent the larger end thereof. Means is also provided for locking the inner member in adjusted axial relation within the outer member and a plurality of fittings are placed in the outer member in such manner as to register one at a time with the groove whereby lubricant is fed under pressure to selected fittings which are interconnected by pipes or the like to the parts to be lubricated.

Referring more particularly to the drawings, there is shown therein a control distributor for lubricant comprising an outer conical member 10 adapted to be situated in a convenient position upon a machine to be lubricated thereby and, in this instance, supported upon a frame 11 by means of brackets 12.

In a flattened smaller end 13 of the member 10 is a fitting 14. A grease gun 15 or the like is connected to the fitting 14 by means of a pipe line 16.

Within the outer conical member 10 there is provided a closely fitting inner conical member 17 which is provided with a longitudinal slot 18 which extends from its flattened smaller end 19 to a point adjacent the larger end thereof.

A plurality of fittings 20 are positioned in the outer member 10 in such manner that but one thereof may register with the groove 18 regardless of the position of the inner member 17 with respect to the outer member 10. To each of the fittings 20 is connected a pipe line 21 which interconnects in each case with a part of a machine to be lubricated.

Affixed to the rear or larger edge of the member 10, by means of screws 22 or the like, is a transversely extending bracket 23. The larger or rear edge of the inner member 17 is provided with a series of notches 28.

A centrally disposed tension bolt 29 extends through an enlarged portion 30 of the bracket 23 and is threaded therein and a bearing 31 is threaded upon the outer end of the bolt 29. The tension bolt 29 is provided with an operating handle 34 upon its outer end and with an integral collar 32 adjacent its inner end.

Pivotally mounted upon the bearing 31 is a lever 40 having an operating link 41 connected to its outer end and is provided with a pawl 42 which is in engagement with the teeth 28. A pair of stop pins 43 and 44 are affixed to the outer edge of the member 10 and limit the movement in either direction of the lever 40. Affixed to the bracket 23 is a detent 45 which is in the path of travel of a final stop pin 46 carried by the member 17.

In operation, it will be understood that oil or other lubricant 34 is fed by means of the gun 15 or like apparatus through the pipe 16 into the outer member 10 and thence through the groove 18 through that particular fitting 20 which is then in registry therewith and thence through the pipe 21 connected with such fitting to the part to be lubricated. The operator, having lubricated one machine part in the manner now described may then reciprocate the link 41 either manually or by automatic mechanisms not shown and each such movement will cause the member 17 to revolve a distance of one of the teeth 28 to bring the next opening 20 into alignment with the groove 18. When the stop member 46 is encountered by the detent 45, all of the openings 20 will have come into registry with the groove 18 and the lubrication will have been completed. The pins 43 and 44 are so placed as to limit the movement of the lever and its attached pawl 42 in such manner that only one tooth 28 is engaged and moved through one reciprocation of the lever. The movement of the link 41 may be timed, if so desired.

While but one form of the invention has been shown and described herein, it will be readily apparent to those skilled in the art that many minor modifications may be made without departing from the spirit of the invention or the scope of the appended claim.

What is claimed is:

An apparatus of the character described comprising an outer conically shaped member, an inlet pipe at the smaller end of said outer member, a plurality of outlet pipes connected to the outer member in spaced axial relation, a conically shaped inner member revolubly mounted in close alignment within said outer member and having a groove extending longitudinally in the outer side thereof from the smaller end thereof to a point adjacent the larger end thereof and having a series of teeth formed in its larger end, adjustable tensioning means for holding the inner member in engagement with the outer member, said means comprising a bracket mounted on the outer member and extending transversely across its larger end and a bolt threaded in said bracket and bearing against said inner member, and a handle revolubly mounted on the bracket and having a pawl affixed thereto for selective engagement with said teeth.

WILLIAM D. BROCKMAN.

REFERENCES CITED

The following references are of record in the file of this patent:

UNITED STATES PATENTS

| Number | Name | Date |
|---|---|---|
| 260,972 | Goodrich | July 11, 1882 |
| 1,163,687 | Purvis | Dec. 14, 1915 |
| 1,772,134 | Dunbar | Aug. 5, 1930 |
| 1,814,907 | Dugan | July 14, 1931 |
| 2,143,565 | Minea | Jan. 10, 1939 |

FOREIGN PATENTS

| Number | Country | Date |
|---|---|---|
| 251,760 | Germany | of 1912 |
| 376,043 | Italy | of 1939 |